Aug. 19, 1969     M. R. PICHARD     3,462,591
MULTIUSE LIGHTING DEVICE
Filed March 2, 1966     2 Sheets-Sheet 1
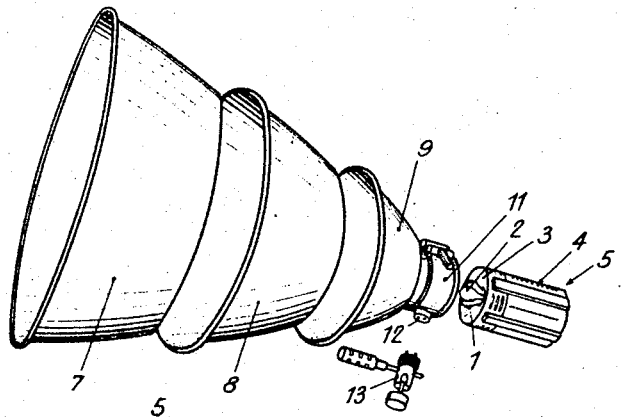
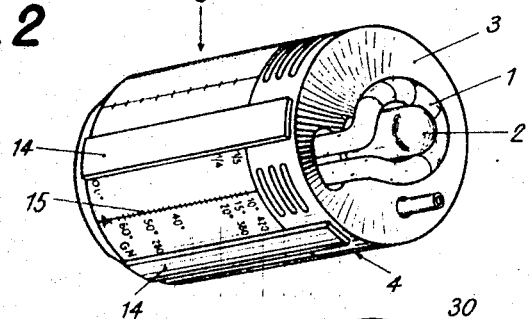
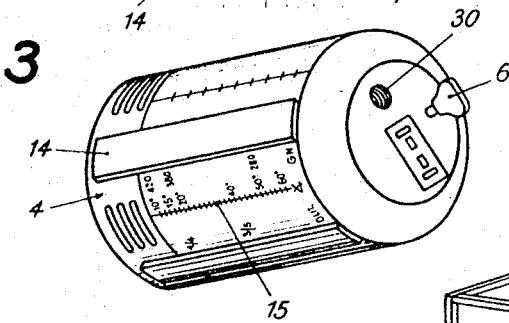
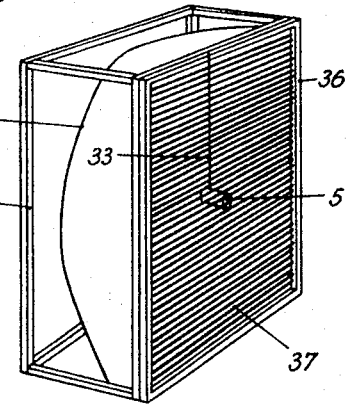
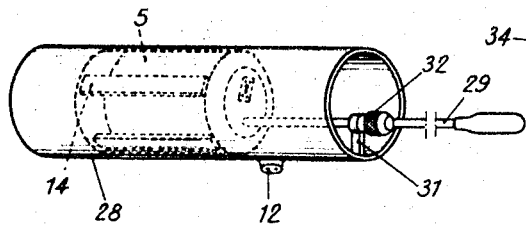
INVENTOR
MARC ROGER PICHARD
BY Young + Thompson
ATTYS.

Aug. 19, 1969  M. R. PICHARD  3,462,591
MULTIUSE LIGHTING DEVICE
Filed March 2, 1966  2 Sheets-Sheet 2

INVENTOR
MARC ROGER PICHARD
By Young & Thompson
ATTYS.

United States Patent Office 3,462,591
Patented Aug. 19, 1969

3,462,591
MULTIUSE LIGHTING DEVICE
Marc Roger Pichard, Sainte Gemme par Feucherolles,
France, assignor to Societe anonyme: Balcar, Paris,
France, a French company
Filed Mar. 2, 1966, Ser. No. 531,224
Claims priority, application France, Mar. 6, 1965,
8,222
Int. Cl. G03b *15/02;* F21v *19/02*
U.S. Cl. 240—1.3      6 Claims

ABSTRACT OF THE DISCLOSURE

A lighting device comprises a light source in unitary assembly with a small reflector and a housing that slides axially within a collar on a larger reflector. The larger reflector is at the rear of a frame in which are disposed a pair of carriers. Each carrier has a plurality of upwardly opening grooves for detachably receiving a plurality of light-transmitting devices, and the distance between the carriers may be changed by rotation of a helix.

---

The present invention relates to a multi-use lighting or illuminating device chiefly for use in photography (particularly for taking photos and for reproduction, printing and enlargement work or the like), for motion picture, television and stage lighting as well as for advertising purposes, for lighting show windows or pictures, e.g., in picture galleries or for similar uses.

The object of the invention is to provide a lighting or illuminating device made up of different parts, many of which can be used either separately or in combination with others, depending on what the need is. Thus, using standardized parts lending themselves to mass production, one can make up many different types of lighting equipment each perfectly adapted for the particular lighting effect or use desired.

According to the invention, the multi-use lighting or illuminating device comprises a light source, a small diameter reflector positively associated with said light source, said two elements being gathered in one and the same housing, an outer element for changing or controlling the angle or concentration of the light coming from said light source, and means on said housing for adjustably mounting the same in said outer element. Said outer element can be a reflector element, which preferably is provided with a tubular portion in which said housing is slidably fitted. The housing can be provided with a graduated scale permitting a reading of its adjusted position within said tubular portion.

According to an embodiment of the inevntion, there is provided a set of reflector elements one of which constitutes said outer element, said reflector elements being interchangeable. At least one reflector element of said set is adapted to receive additional reflector elements.

According to another embodiment of the invention, the outer element is a reflector element and is mounted on a frame having a first carrier arranged on the side of said frame nearest said housing and reflector element, and capable or receiving an iris, masks, screens, filters, transparency, holders, diffusers or equivalent elements, a second carrier arranged on that side of the frame remote from said housing and reflector element and adapted to receive an optical system, and means for adjusting at least one of said carriers on said frame.

According to still another embodiment of the invention, the deivce is made up of a dismountable swivel on which is mounted a tube of any suitable cross sectional shape with a black mat interior, within which slides the housing holding the small diameter reflector and the light source. A means is provided for adjusting the position of said housing inside the tube and for holding it in place, thus very simply and efficiently being able to vary the angle lit from approximately 10° to 50°.

According to another embodiment of the invention, the device is made up of a frame on which is mounted a large size, square or rectangular reflector (basically parabolical or elliptical in shape) with a means for supporting the aforementioned light housing on said frame so that the light source is situated in front of the reflector at or about its focal point, and a removable variable, louver system which can be placed in front of said reflector. Means are also provided to vary the diffusion and angle of the light emitted. The frame and reflector design permits the juxtaposition of any number of these large size reflectors.

In order that the invention may be better understood and more readily carried into practice, it is more completely described hereafter with reference to the accompanying drawings showing illustratively but nonlimitatively several construction forms of the improved device according to the invention.

FIGURE 1 is a perspective view of one constructional form of the lighting or illuminating device according to the invention.

FIGURE 2 is a perspective view showing the housing including the light source and the built-in small diameter reflector assuming said housing to be viewed from the front.

FIGURE 3 is a perspective view corresponding to FIG. 2 but assuming said housing to be viewed from the rear.

FIGURES 5 and 6 are views of two further constructional forms of the device.

Figure 4:
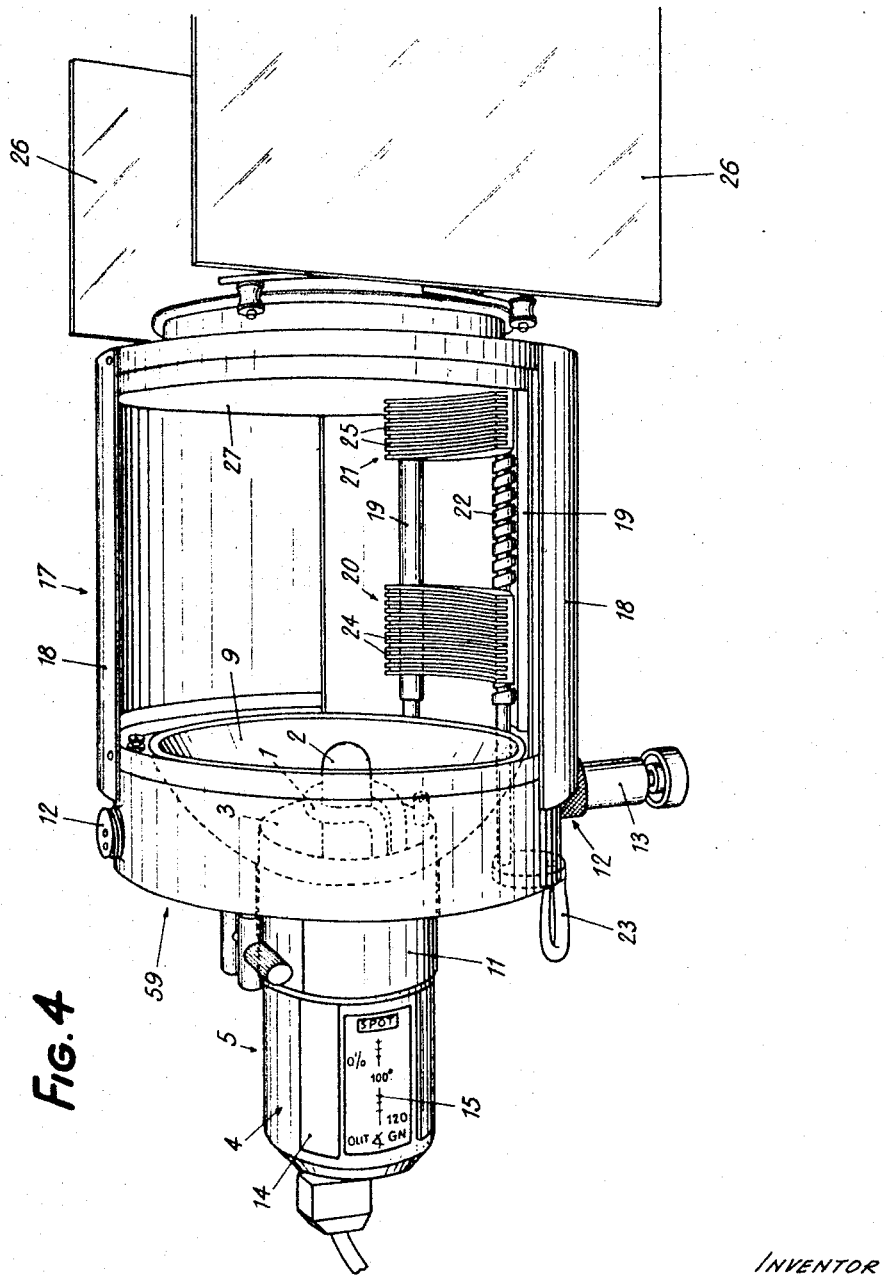
FIGURE 4 is a perspective view showing another constructional form of the device.

As shown by the drawings, the device comprises a light source constituted in the present case by an electronic flash tube 1 associated with a modelling lamp 2 and fitted in the central portion of a small diameter reflector 3, said elements being housed in the end portion of a casing 4 which also contains all the usual control means for the electronic flash tube with which they form a lighting housing 5.

Obviously, the light source might be constituted by an electronic flash tube of another type, whether associated with a modelling lamp or not, or alternatively by an incandescent lamp or by any other desired gaseous discharge lamp.

Normally, the small diameter reflector is basically of the parabolical type and the position of the light source 1–2 with respect to said reflector 3 is adjustable with a high degree of accuracy, for example by means of button 6 on the rear side of housing 5. Normally, the shape and the position of the reflector 3 are adapted to the type of light source that is used and proper determination or positioning can be readily done by technicians skilled in this field.

According to the constructional form shown in FIGURE 1, the device comprises a set of interchangeable reflector elements 7, 8, 9 which may be fitted together. Reflector 9 is provided with a tubular portion surrounded by a collar 11 having connecting element 12 to which at will a securing member 13 for example of the known ball-and-socket type may be connected or from which it may be disconnected.

Housing 5 is provided in the present case with skids 14 on which it slides within the tubular portion of reflector element 9. Housing 5 also carries a graduated scale 15 giving an indication of the position of housing 5 relative to reflector element 9. By varying the distance of housing 5 within collar 11, one can vary the illumination according to requirements. The graduated scale 15 may also carry other data such as the lighting angle, the quantity of light, etc. One of the many advantages of being able to vary the position of the housing 5 in reflector element 9 is the fact that in reality, two reflectors 3 and 9 are being used for reflecting the light from light source 1. Therefore, moving housing 5 will vary the angle being lit by reflector element 9 without varying the angle being lit by reflector 3 which normally is fixed to light the center zone. Thus, an extremely wide angle range of lighting can be obtained without having significantly less light in its center even when the housing 5 is positioned for wide angle coverage.

When the device is to be used as a projector (either as an "optical spot" or image projector), reflector elements 7–9 are preferably of elliptical shape. When the device must furnish a maximum of light at a great distance or is used as a light box for the reproduction and/or the enlargement of transparent images, reflector elements 7–9 are then normally of the parabolical type. A complete device may comprise for example interchangeable elliptical or parabolical reflector elements so as to render the necessary adaptation feasible in each case.

By properly combining together several parabolical reflector elements, the resultant light projection may be altered. When using it as a light box, a diffusing surface is provided between the illuminated transparent object and the reflector element of elements 7–9.

Reference being now had to FIGURE 4, it will be seen that housing 5 comprising light source 1 and its associated small diameter reflector 3 are mounted in the tubular portion of reflector element 9 (basically elliptical in profile) in the same fashion as in the constructional form visible in FIGURE 1. The assembly thus constituted is combined with an "optical spot" designated generally by 17, including a connecting element 12 to which a securing member 13 of the aforementioned type may be joined.

Device 17 comprises securing means (not shown) for reflector element 9 supporting housing 5, a cover 18 preferably of cylindrical shape and being able to rotate, one or two rods 19, a grooved rear carrier 20 and a front grooved carrier 21, also a system permitting the distance between the two carriers to be varied, said system comprising a helically threaded screw 22 controlled by means of a crank 23. When rod 19 is mounted eccentrically, the clearance between said rod and said support 20 can easily be controlled and limited. An electric motor can also be used to vary the distance between carriers 20 and 21.

As illustrated, carrier 20 is grooved as shown at 24 in order to hold conveniently one or more elements. This carrier may hold for example an iris (not shown) permitting the illumination angle to be altered without modifying the quantity of light in the center of the illuminated zone. This combination also gives a photographer the possibility of changing precisely and easily the area and angle he wishes to light. Similar results may be obtained by fitting into carrier 20, masks or screens of suitable types, or variable magnetic masks permitting the shape of the resultant illuminated zone to be changed.

Carrier 20 may be used also for receiving transparency holders. Transparencies thus placed in this "negative" carrier are illuminated by transparency and their image is projected by the optical system in carrier 21 which may be combined with the aforesaid elements as indicated hereafter.

Carrier 20 may also receive color filters, diffusers or similar elements.

In FIGURE 4 is shown a second grooved carrier 21 similar to carrier 20 and grooved at 25 on its inner face for receiving various elements.

Carrier 21 may be used particularly for receiving an optical system of known type made up of one or more optical elements, a lens or equivalent element, or for example a Fresnel lens. By placing in carrier 21 a lens mounted on a suitable board, and by placing a transparency in a transparency holder placed in carrier 20, one can project an image of the transparency. One can also place in carrier 21 filters and diffusers, as well, as an iris or diaphragm which, due to the position that it occupies with respect to the optical system, then has a function different from that of iris mounted in carrier 20 and thus permits a variation of the diffusion of images projected with a given optical system; a variation of the quantity of light projected; or furthermore, in combination with an optical system, a change of the diameter of the optical system causes a change in the sharpness of the shadows cast by illuminated objects, without projecting an image of the light source.

Carrier 21 may also carry prisms or even another optical system, for example a cylindrical lens forming an anamorphic element.

A laser device can be obtained cheaply and easily by placing in carrier 21 a reflecting system and a support for the ruby or other laser element. This reflector system reflects the highly concentrated rays coming from the assembly 1–3–9 onto the laser element energizing it.

Preferably, elements placed in carriers 20, 21 should be able to be controlled easily. These elements are best mounted upon plates made to fit into the grooves in carriers 20 and 21. If the plates are circular in shape, they can be turned easily in carriers 20 and 21. Although FIGURE 4 shows carriers circular in shape and covering 90°, it is obvious that each carrier might be built in some other way.

"Barn doors" 26 are arranged in front of forward aperture 27.

According to the further constructional form shown by FIGURE 5, housing 5 is fitted with skids 14 and is placed within a cylindrical tube 28. Sliding motion of housing 5 within tube 28 is performed for example by a rod 29 attached to housing 5 by means such as screwing its threaded end in a correspondingly internally thread portion 30 (FIGURE 3) provided on the back of housing 5. Tube 28 carries a guiding arm 31 with a locking system 32 which holds housing 5 in the selected position inside tube 28. The inside of this tube is preferably mat black and may be provided with baffles to reduce reflection. A connecting member 12 is here again provided on tube 28 to be used in conjunction with securing member 13.

Owing to the small diameter of reflector 3, a considerable angle variation (ranging for example from 10° to 50°) may be obtained with the aid of tube 28 without involving undue bulkiness, and reflector 3 permits an increase of the quantity of light with respect to source 1–2. The quantity of light remains constant in the middle of the beam even if the illumination angle varies since reflector 3 and light source 1, 2 light up this zone. Barn doors and conical snoots (not shown) added to the front of aperture 27 permits a better control of the illuminated zone.

According to the further constructional form shown in FIGURE 6, housing 5 is supported by arm 33 on frame 34 which is preferably of square or rectangular shape, in which a parabolical or elliptical reflector 35 is fitted. The depth of reflector 35 can be considerably reduced and yet the area of the reflector kept large by using multisurface, multifocal, concentric ring parabolical or elliptical reflectors.

A removable frame 36 holding a detchable, variable louver system may be placed in front of the device.

Obviously, the elements of which the several constructional forms of the device are made up may be combined in various ways. Depending upon the contemplated use, a number of elements are united to form a suitable assembly, or a person having all the parts will be able to use them at will for miscellaneous uses, avoiding the necessity of buying each time, complete separate lighting devices. The basic element for all these constructional combinations comprises housing 5 containing the light source 1-2 and the small diameter reflector 3. There results, jointly with the possibility of mass production of the elements, a substantial reduction of investment costs.

Obviously such a lighting or illuminating device may be combined with other means or systems, for example with remote control devices or with one or several reflecting screens, or with umbrella-shaped reflectors, etc.

Other variations of minor nature are conceivable within the ambit of technical equivalencies without departing from the scope of the subjoined claims.

What is claimed is:

1. A lighting device comprising a unitary assembly of a light source, a small reflector for said light source, and a housing supporting said light source and small reflector; a large reflector; and means mounting said unitary assembly centrally of said large reflector for movement of said assembly as a unit relative to said large reflector, said large reflector having a sleeve centrally thereof, said unitary assembly being slidable lentghwise in said sleeve.

2. A lighting device as claimed in claim 1, said housing projecting rearwardly from said sleeve, said housing having a scale thereon that registers with a rear portion of said sleeve to indicate the position of said light source relative to said large reflector.

3. A lighting device as claimed in claim 2, said sleeve and housing having noncircular portions thereon that engage with each other to prevent rotation of said sleeve and housing relative to each other.

4. A lighting device comprising a unitary assembly of a light source, a small reflector for said light source, and a housing supporting said light source and small reflector; a large reflector; means mounting said unitary assembly centrally of said large reflector for movement of said assembly as a unit relative to said large reflector, a frame on which said large reflector is mounted, a pair of carriers on said frame forwardly of said large reflector, means for detachably mounting at least one light-transmitting device on each said carrier, and means for moving at least one of said carriers relative to said frame to change the distance between said carriers.

5. A lighting device as claimed in claim 4, each said carrier having a plurality of grooves therein for detachably receiving a plurality of devices for the transmission of light.

6. A lighting device as claimed in claim 4, said means for changing the distance between said carriers comprising a helically threaded member extending lengthwise of said frame and engageable with said at least one carrier to move said at least one carrier relative to the other said carrier upon rotation of said helically threaded member.

References Cited

UNITED STATES PATENTS

| 1,815,874 | 7/1931 | Jensen | 240—3.1 |
|---|---|---|---|
| 1,835,176 | 12/1931 | Oberg et al. | |
| 1,880,399 | 10/1932 | Benjamin | 240—44.2 |
| 2,104,911 | 1/1938 | Snyder | 240—46.03 XR |
| 3,255,666 | 6/1966 | Davis et al. | 240—3.1 XR |
| 1,421,838 | 7/1922 | Schaeffer | 240—46.07 |
| 2,050,085 | 8/1936 | Cherniak | 240 |
| 2,691,918 | 10/1954 | Robins et al. | 240—1.3 XR |
| 2,942,100 | 6/1960 | Fischer | 240—1.3 |
| 2,950,382 | 8/1960 | Hatch | 240—1.3 |
| 3,028,483 | 4/1962 | Simmon | 240—41.35 |
| 3,049,611 | 8/1962 | Kluge | 240—1.3 |
| 3,140,053 | 7/1964 | Lowell | 240—1.3 |
| 3,185,828 | 5/1965 | Ludloff | 240—46.59 XR |
| 3,316,398 | 4/1967 | Dayton et al. | 240—1.3 XR |

FOREIGN PATENTS 401,973  10/1933  Great Britain.

NORTON ANSHER, Primary Examiner

R. P. GREINER, Assistant Examiner

U.S. Cl. X.R.

240—3.1, 44.2, 46.03